United States Patent Office 3,406,903
Patented Oct. 22, 1968

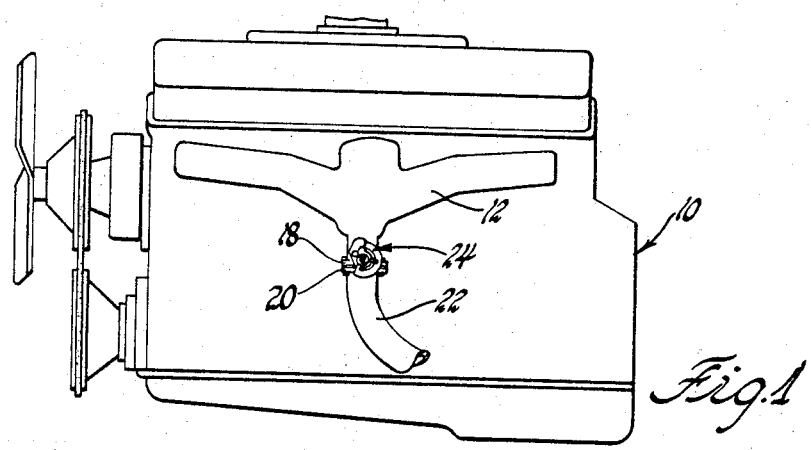
Fig.1
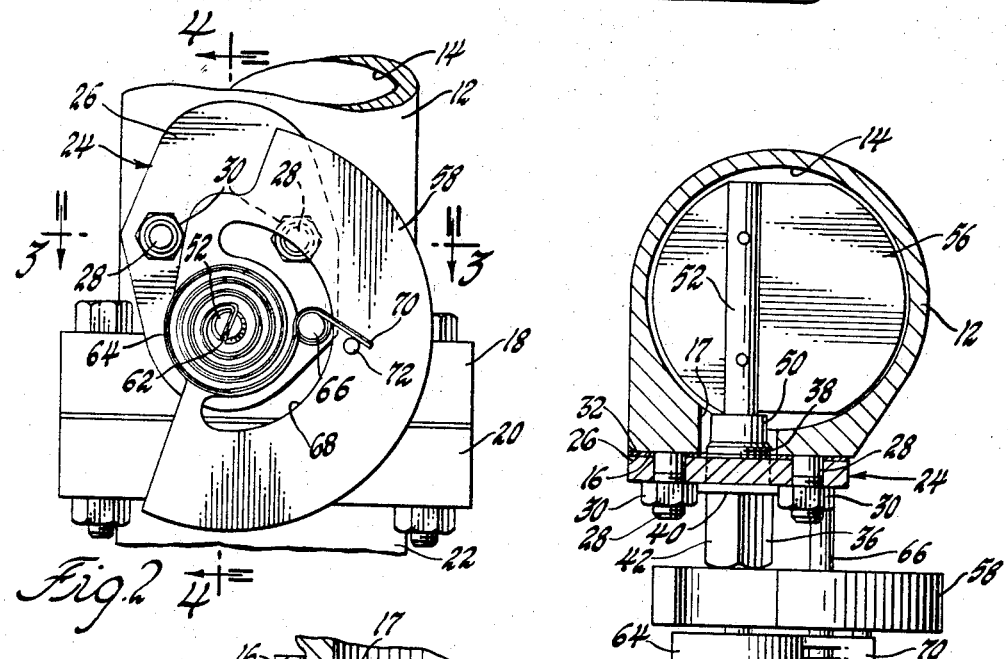
Fig.2
Fig.3
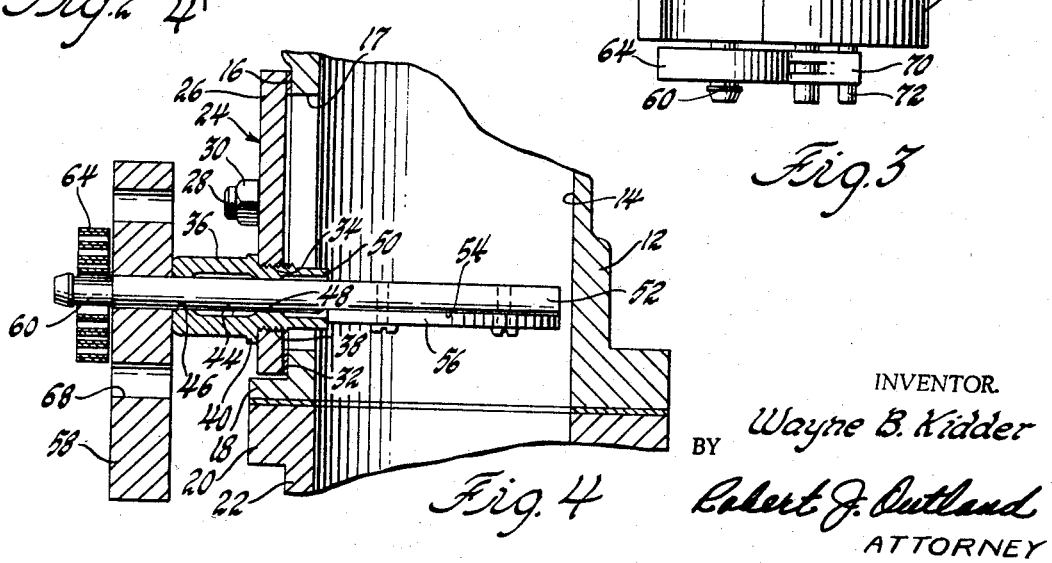
Fig.4
INVENTOR.
Wayne B. Kidder
BY
Robert J. Outland
ATTORNEY

3,406,903
ENGINE EXHAUST FLUID FLOW
CONTROL VALVE
Wayne B. Kidder, Wyoming, Mich., assignor to General
Motors Corporation, Detroit, Mich., a corporation of
Delaware
Filed Aug. 22, 1966, Ser. No. 574,059
5 Claims. (Cl. 236—102)

ABSTRACT OF THE DISCLOSURE

A preferred embodiment comprises an exhaust fluid flow control valve with a shielded cantilevered bearing arrangement to reduce sticking and arranged for ease of service and replacement of wearing parts.

---

This invention relates to fluid flow control valves and more particularly to exhaust heat flow control valves used with automotive and other engines.

A flow control valve disposed within an engine exhaust conduit or elsewhere and adapted to divert hot engine exhaust gases for one purpose or another is subject to various contaminants in the exhaust gases as well as high gas temperatures which may combine to cause bearing seizure or other problems leading to improper operation of the valve.

The present invention provides an improved flow control valve assembly having a number of advantages over valves disclosed in the prior art. It is, for example, a feature of the present invention to provide a flow control valve assembly having a cantilever bearing support for the valve plate so that misalignment problems of bearings mounted on opposite sides of the valve plate are avoided.

A further feature of the invention is that it provides a shield to prevent direct contact of the contaminant laden exhaust gases with the bearing surfaces.

A still further feature of the invention is that the valve assembly is mounted on a side wall of the exhaust system and is removable as a unit for servicing and repair without disassembly of other exhaust components.

Still another feature of the invention is that certain elements of the assembly may be easily disassembled for servicing or replacement of damaged or worn parts.

These and other features and advantages of the invention will be more apparent from the following description of a preferred embodiment of the invention, having reference to the drawings, wherein:

FIGURE 1 is a side elevational view of an internal combustion engine having an exhaust fluid flow control valve according to the invention;

FIGURE 2 is an enlarged view of a portion of the engine of FIGURE 1 showing the fluid flow control valve mounting in the exhaust system;

FIGURE 3 is a cross-sectional view taken generally in the plane indicated by the line 3—3 of FIGURE 2 and FIGURE 4 is a cross-sectional view taken generally in the plane indicated by the line 4—4 of FIGURE 2.

Referring more specifically to the drawing, there is shown an engine 10 having an exhaust manifold 12 secured to the engine to receive exhaust gases from the various engine cylinders (not shown). The lower end of the manifold defines a generally cylindrical passage 14 and includes a flat mounting wall 16 having an elongated opening 17 for receiving a flow control valve according to the invention. The manifold terminates in a flange 18 which is secured to a mating flange 20 of an exhaust pipe 22 to provide for carrying exhaust gases away from the manifold.

A fluid flow control valve assembly generally indicated by numeral 24 is secured to manifold 12 to control in a predetermined manner the flow of exhaust gases through the manifold and exhaust pipe 22.

Flow control valve assembly 24 comprises a mounting plate 26 which is secured by studs 28 and brass nuts 30 to flat mounting wall 16 covering opening 17 and having a gasket 32 sealing the joint against the escape of exhaust gases.

Near one end of mounting plate 26 is a threaded opening 34 which receives a unitary bearing and shield member 36. Member 36 is preferably made of stainless steel but may alternatively be made of bronze or other suitable material and includes a threaded body portion 38 with a flange 40 and an extending portion having wrench receiving flats 42 for tightening the flange 40 against mounting plate 26. Internally, the member 36 has an axially extending bore 44 having a pair of spaced bearing portions 46 and 48 with an enlarged diameter portion therebetween. A shield portion 50 extends inwardly of plate 26 and bearing portion 48 for a purpose to be subsequently described.

A shaft 52 extends through member 36 and is rotatably journaled in bearing portions 46 and 48. One end of the shaft extends into and nearly across cylindrical exhaust passage 14 and includes a flattened portion 54 to which is secured in any desired manner a valve plate 56. The valve plate is arranged for rotational movement with the shaft and is sized so that when disposed transversely of passage 14, it blocks a substantial portion of the passage to exhaust gas flow therethrough; however, clearance is provided between the plate 56 and the passage 14 at all times. Additionally, the plate 56 is sufficiently small to be removed from the passage through elongated opening 17 in the mounting wall.

Near the end of shaft 52 opposite from that on which the valve plate 56 is mounted, a counterweight 58 is secured to the shaft. The weight has a moment arm with respect to the shaft such that it tends to move the valve plate 56 in an opening direction when the assembly is in its installed position.

The end of shaft 52 outboard of the counterweight is necked down at 60 and slotted at 62 to receive the end of a flat spiral bimetallic spring 64. The other end of spring 64 engages a pin 66 which is secured to mounting plate 26 and extends through an arcuate slot 68 in the counterweight 58. Whenever the valve plate 56 is in the closed position, a short tail portion 70 of the spring also engages a stop pin 72 which is carried in the counterweight.

The bimetallic spring 64 is arranged such that when the engine is cold, it biases the valve plate closed by turning the shaft and moving counterweight 58 upwardly until stop pin 72 strikes the tail 70 of the spring. After the engine is started, the exhaust temperature increases heating the spring and causing it to relax sufficiently to permit weight 58 and the pressure of the exhaust gases to open the valve completely.

The described embodiment of a fluid flow control valve assembly provides a number of advantages. The spaced bearing portions of member 36 provide adequate cantilever support for the shaft and valve assembly without requiring an additional bearing on the opposite end of the shaft. Thus the problems of bearing misalignment due to heat warping of the manifold or faulty installation are avoided. The shield portion 50 which closely surrounds the shaft inwardly of bearing 48 keeps the bearing surface from contact with the direct flow of gases through the exhaust passage and thereby reduces seizing of the shaft in the bearing or excessive bearing wear which might be caused by the exhaust gas contaminants. Additionally, the valve assembly can be easily removed without disassembling other parts of the exhaust system by merely removing nuts 30 and pulling out the complete assembly through opening 17. In addition, the valve plate or the valve plate and shaft assembly may be replaced with relative ease if necessary as also may be the unitary bearing and shield member 36 should any of these parts become damaged or worn.

It is apparent that numerous modifications or changes of the disclosed embodiment could be made within the spirit and scope of the disclosed invention, and it is, therefore, intended that the invention be limited only by the language of the following claims.

I claim:
1. In an engine exhause system, a fluid flow control valve assembly comprising
   a mounting plate having an opening therethrough,
   a bearing and shield member secured in said opening and having a pair of spaced bearing surfaces and a cylindrical shield portion aligned with said surfaces and extending outwardly from one of them,
   a shaft through said bearing and shield member and journaled solely by said bearing surfaces for rotational movement therein and,
   a valve plate secured to said shaft adjacent said shield portion,
   said valve assembly being installable on an engine exhaust fluid passage means having an opening in one wall thereof to permit entry of said valve plate and closeable by the securing of said mounting plate to said wall whereby rotational position of said valve plate will control the flow of fluid through said passage means, and temperature responsive means for moving said shaft.

2. The assembly of claim 1 and further comprising
   a counterweight secured to said shaft on the other side of said bearing and shield member from said valve plate and said temperature responsive means comprising,
   temperature responsive spring means connected to said shaft adjacent said counterweight,
   said counterweight and spring means being arranged such that upon installation of said valve assembly on said fluid passage means said counterweight will bias said valve plate in an opening direction and said spring means will in response to varying temperatures variably bias in a predetermined manner said valve plate in a closing direction.

3. In combination with an engine exhaust system having exhaust passage means and an opening in one wall thereof, an exhaust flow control valve assembly comprising
   a butterfly valve supported in said exhaust passage means on a shaft portion extending through said wall opening and movable with said shaft portion between closing and open positions to control exhaust fluid flow through said passage means,
   mounting means rotatably supporting said butterfly valve in cantilever fashion in said exhaust passage means and including a bearing portion journaling said shaft portion outboard of said wall opening and a shield portion closely surrounding said shaft portion inwardly of said bearing portion to protect the bearing the bearing surface from contaminants in the exhaust fluid, and temperature responsive means for moving said butterfly valve.

4. The combination of claim 3 wherein said wall opening is sufficiently large to permit removal of said butterfly valve therethrough and said mounting means further includes a mounting plate closing said opening and supporting said bearing and shield portions.

5. The combination of claim 4 and further comprising a counterweight secured to said shaft portion outboard of said bearing portion and arranged to bias said butterfly valve in an opening direction and said temperature responsive means comprising temperature responsive spring means acting on said shaft outboard of said bearing portion and adapted to control the closing of said butterfly valve in a predetermined manner.

References Cited

UNITED STATES PATENTS

| | | | |
|---|---|---|---|
| 1,377,168 | 5/1921 | Awe | 251—305 X |
| 2,608,203 | 8/1952 | Butler | 251—305 X |
| 2,725,862 | 12/1955 | Dolza | 123—122 |
| 2,858,987 | 11/1958 | Ellis | 236—101 |
| 2,862,685 | 12/1958 | Lundberg | 251—305 |
| 3,141,470 | 7/1964 | Fontaine | 137—68 |
| 3,227,428 | 1/1966 | Charron | 236—101 X |
| 3,300,137 | 1/1967 | Murphy | 236—101 |

ROBERT A. O'LEARY, *Primary Examiner.*

W. E. WAYNER, *Assistant Examiner.*